(12) United States Patent
Shams

(10) Patent No.: US 12,072,434 B2
(45) Date of Patent: Aug. 27, 2024

(54) AMPLITUDE TAPERING IN A BEAM STEERING VEHICLE RADAR FOR OBJECT IDENTIFICATION

(71) Applicant: BDCM A2 LLC, Dover, DE (US)

(72) Inventor: Soren Shams, Carlsbad, CA (US)

(73) Assignee: BDCM A2 LLC, Dover, DE (US)

( * ) Notice: Subject to any disclaimer, the term of this patent is extended or adjusted under 35 U.S.C. 154(b) by 414 days.

(21) Appl. No.: 17/143,151

(22) Filed: Jan. 6, 2021

(65) Prior Publication Data
US 2021/0208239 A1  Jul. 8, 2021

Related U.S. Application Data

(60) Provisional application No. 62/957,744, filed on Jan. 6, 2020.

(51) Int. Cl.
*G01S 7/03* (2006.01)
*G01S 7/41* (2006.01)
*G01S 13/72* (2006.01)
*G01S 13/931* (2020.01)

(52) U.S. Cl.
CPC .............. *G01S 7/032* (2013.01); *G01S 7/417* (2013.01); *G01S 13/726* (2013.01); *G01S 13/931* (2013.01)

(58) Field of Classification Search
CPC ........ G01S 7/032; G01S 7/417; G01S 13/726; G01S 13/931; G01S 13/34; G01S 13/865; G01S 13/867
See application file for complete search history.

(56) References Cited

U.S. PATENT DOCUMENTS

| | | | | |
|---|---|---|---|---|
| 7,170,446 B1* | 1/2007 | West | ................... | H01Q 13/085 342/372 |
| 11,308,641 B1* | 4/2022 | Porta | ....................... | G06T 7/74 |
| 2005/0151215 A1* | 7/2005 | Hauhe | ................ | H01Q 21/0025 343/702 |
| 2015/0061922 A1* | 3/2015 | Kishigami | .............. | G01S 13/48 342/147 |
| 2015/0270609 A1* | 9/2015 | Jin | ........................... | H01Q 3/30 342/372 |
| 2016/0043465 A1* | 2/2016 | McDevitt | ................ | G01S 13/91 342/368 |
| 2018/0106897 A1* | 4/2018 | Shouldice | ............ | A61B 5/0507 |
| 2020/0219316 A1* | 7/2020 | Baik | ......................... | G06T 7/70 |

OTHER PUBLICATIONS

Ghayoula, et al, "Sidelobe Level Reduction in Linear Array Pattern . . ." 2016 IEEE Intl Conference on Systems, Man, and Cybernetics SMC 2016; Oct. 9-12, 2016; Budapest, Hungary (Year: 2016).*

* cited by examiner

*Primary Examiner* — Donald HB Braswell
(74) *Attorney, Agent, or Firm* — Dinsmore & Shohl LLP

(57) ABSTRACT

Examples disclosed herein relate to a beam steering vehicle radar for object identification. The beam steering radar includes a beam steering receive antenna having a plurality of antenna elements to receive radar return signals, a LNA circuit having a plurality of LNAs, each LNA coupled to each element in the beam steering receive antenna to apply a gain to the return signals to generate amplified return signals, wherein gains of LNAs coupled to center antenna elements are higher than gains of LNAs coupled to edge antenna elements, and a phase shifter circuit to apply a plurality of phase shifts to the amplified return signals.

17 Claims, 8 Drawing Sheets

AMPLITUDE TAPERING IN A BEAM STEERING VEHICLE RADAR FOR OBJECT IDENTIFICATION

CROSS-REFERENCE TO RELATED APPLICATIONS

This application claims priority from U.S. Provisional Application No. 62/957,744, filed on Jan. 6, 2020, which is incorporated by reference in its entirety.

BACKGROUND

Autonomous driving is quickly moving from the realm of science fiction to becoming an achievable reality. Already in the market are Advanced-Driver Assistance Systems ("ADAS") that can automate, adapt, and enhance vehicles for safety and better driving. The next step will be vehicles that increasingly assume control of driving functions, such as steering, accelerating, braking, and monitoring the surrounding environment and adjusting driving conditions to, for example, avoid traffic, crossing pedestrians, animals, and so on, by changing lanes or decreasing speed when needed. The requirements for object and image detection are critical to enable the aforementioned enhancements, particularly to control and perform driving functions within a short enough response time required to capture, process and turn the acquired data into action. All these enhancements are to be achieved in autonomous driving while ensuring accuracy, consistency and cost optimization for deploying in the vehicles.

An aspect of making this work is the ability to detect, identify, and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment. Therefore, there is a need for vehicular systems that provide improved dynamic, responsive, and intelligent functionality for autonomous driving.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Amplitude tapering in a beam steering vehicle radar for object identification is disclosed. Amplitude tapering, as generally described herein, refers to a reduction of amplitude in antenna side lobes. Reduction of side lobes in a vehicle radar enables the radar to distinguish between signal reflections corresponding to the main lobe from reflections corresponding to the side lobes. This clarifies where the object detection is made giving accuracy to the object detection process. The radar disclosed herein is a beam steering radar capable of generating narrow, directed beams that can be steered to any angle across a Field of View ("FoV") to detect objects. The beams are generated and steered in the analog domain, while processing of received radar signals for object identification is performed with advanced signal processing and machine learning techniques.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
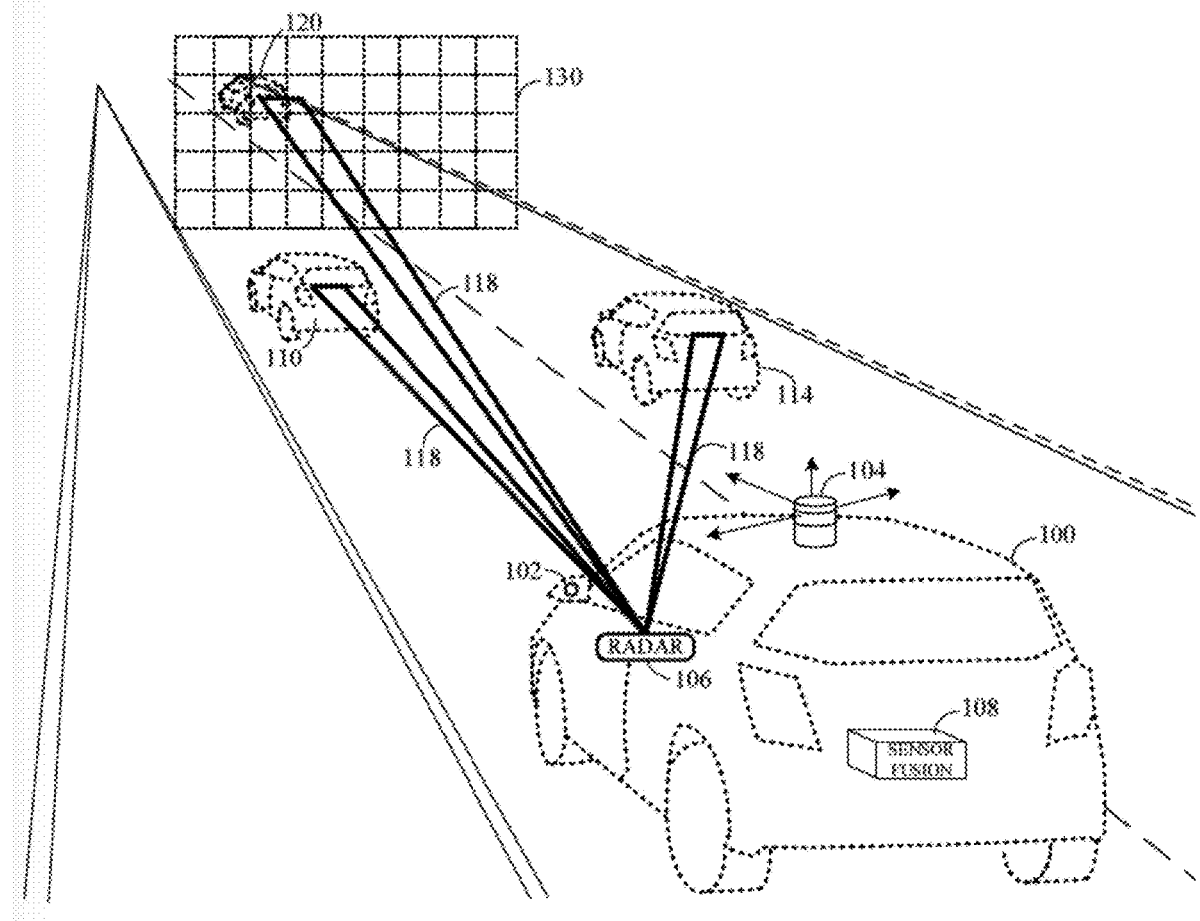
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100, yet may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras are able to capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a true 3D vision and human-like interpretation of the path and surrounding environment of the ego vehicle 100. The beam steering radar 106 is capable of shaping and steering RF beams in all directions in a FoV with at least one beam steering antenna and recognize objects quickly and with a high degree of accuracy over a long range of around 300 meters or more. The short-range capabilities of the camera 102 and the lidar 104 along with the long range capabilities of the radar 106 enable a multi-sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar ("LRR") mode that enables the detection of long range objects in a very short time to then focus on obtaining finer velocity resolution for the detected vehicles. Although not described herein, radar 106 is capable of time-alternatively reconfiguring between LRR and Short-Range Radar ("SRR") modes. The SRR mode enables a wide beam with lower gain, and yet can be configured to make quick decisions to avoid an accident, assist in parking and downtown travel, and capture information about a broad area of the environment. The LRR mode enables narrow, directed beams to reach long distances and at a high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
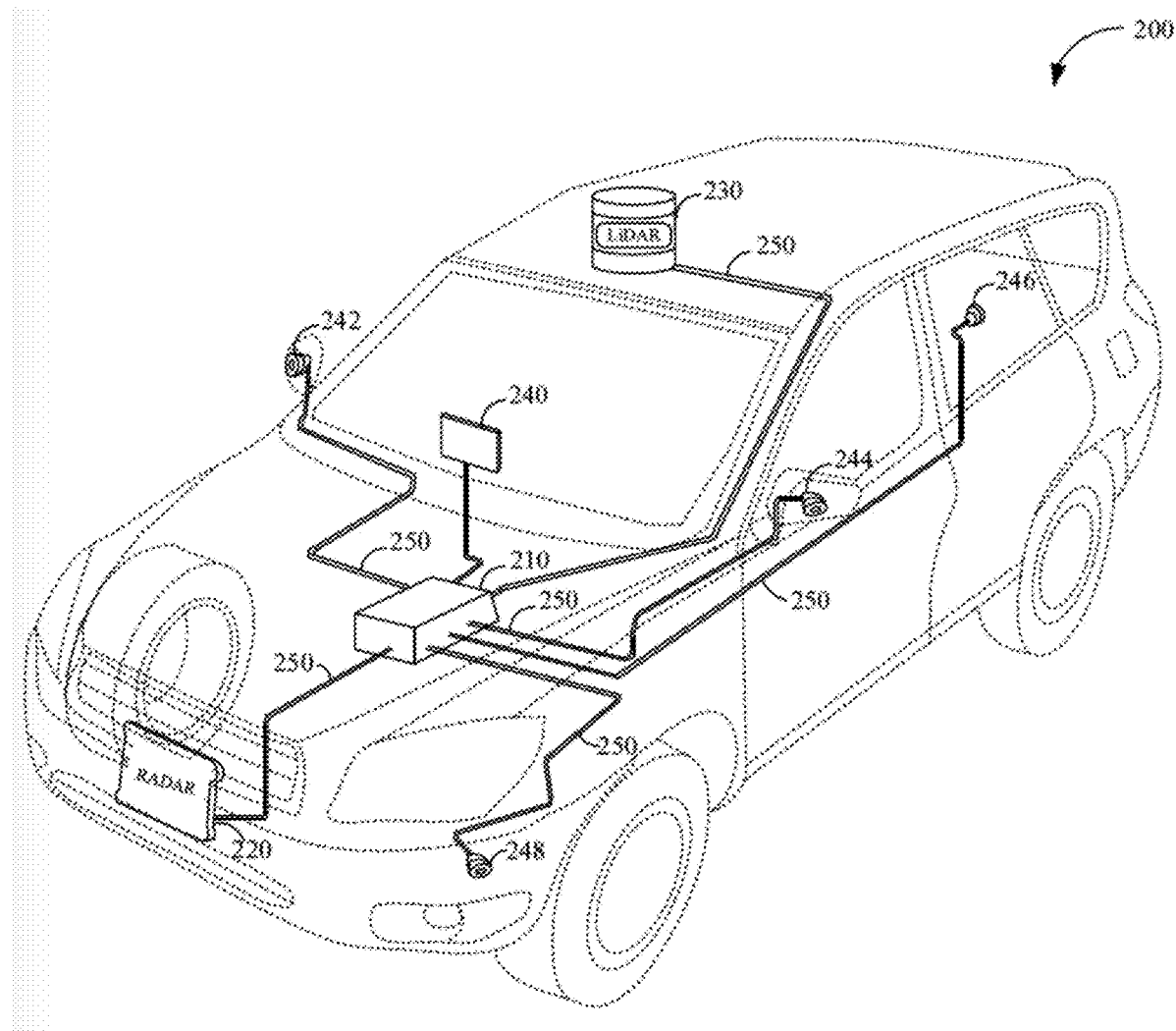
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
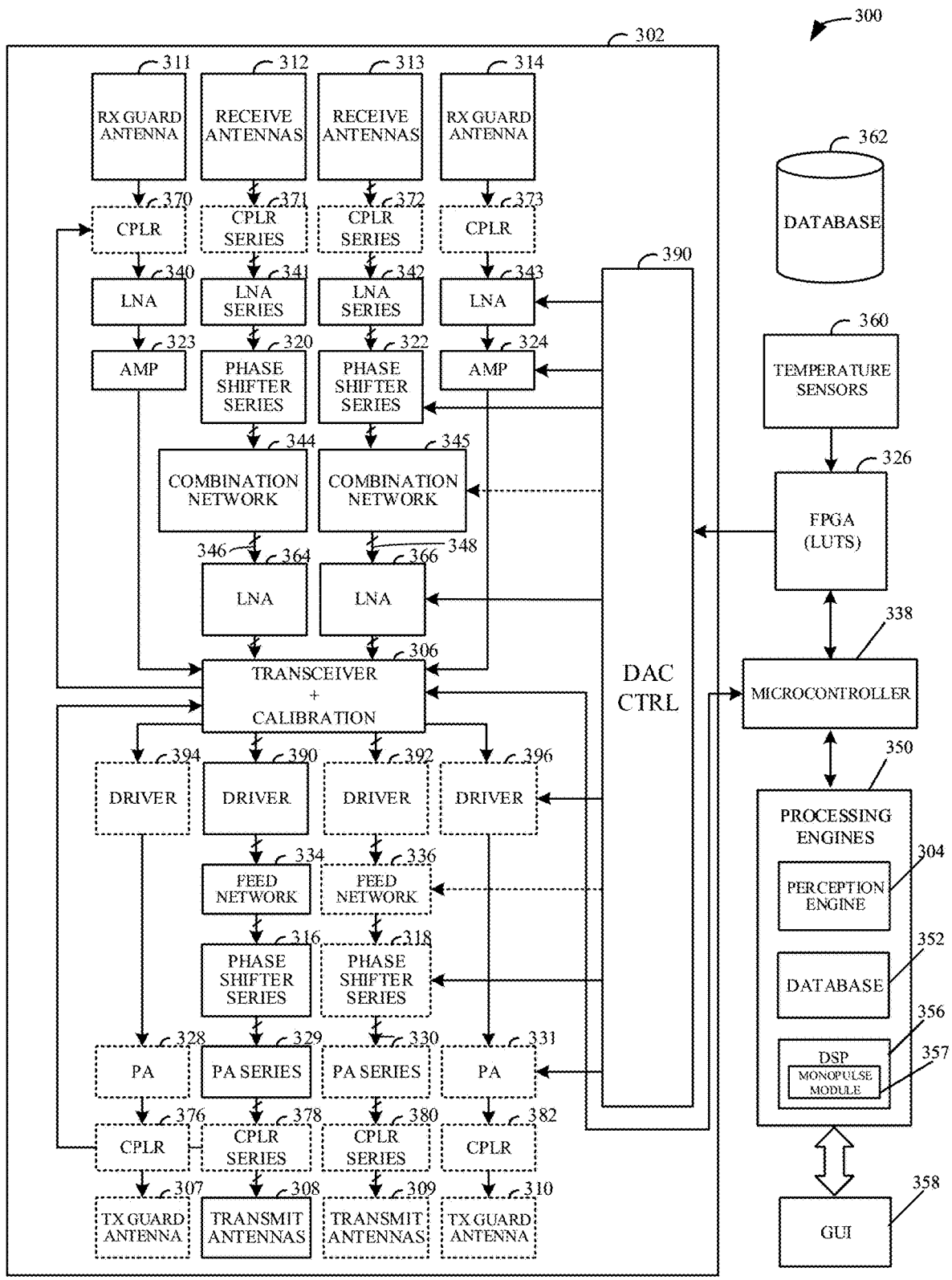
FIG. 3 is a schematic diagram of a beam steering radar system as in FIG. 2 and in accordance with one or more implementations of the subject technology.

FIG. 3 illustrates a schematic diagram of a radar system 300 in accordance with various implementations of the subject technology. The radar module 300 includes a radar module 302 that comprises a receive chain and a transmit chain. The receive chain includes receive antennas 312 and 313, receive guard antennas 311 and 314, couplers 370, 371, 372, and 373 (collectively 370-373), low-noise amplifiers (LNAs) 340, 341, 342, and 343 (collectively 340-343), phase shifter (PS) circuits 320 and 322, amplifiers 323, 324, 364 and 366, and combination networks 344 and 345. The transmit chain includes drivers 390, 392, 394 and 396, feed networks 334 and 336, PS circuits 316 and 318, power amplifiers 328, 329, 330, and 331 (collectively 328-331), couplers 376, 378, 380 and 382, transmit antennas 308 and 309, and transmit guard antennas 307 and 310. The radar module 302 also includes a transceiver 306, a digital-to-analog (DAC) controller 390, a Field-Programmable Gate Array (FPGA) 326, a microcontroller 338, processing engines 350, a Graphical User Interface (GUI) 358, temperature sensors 360 and a database 362. The processing engines 350 includes perception engine 304, database 352 and Digital Signal Processor (DSP) 356. The DSP 356 includes a monopulse module 357. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, the radar system 300 of FIG. 3 may include one or more of the FPGA 326, the microcontroller 338, the processing engines 350, the temperature sensors 360 or the database 362. In some implementations, the electronic device 340 of FIG. 3 is, or includes at least a portion of, the GUI 358.

Radar module 302 is capable of both transmitting RF signals within a FoV and receiving the reflections of the transmitted signals as they reflect from objects in the FoV. With the use of analog beamforming in radar module 302, a single transmit and receive chain can be used effectively to form a directional, as well as a steerable, beam. A transceiver 306 in radar module 302 can generate signals for transmission through a series of transmit antennas 308 and 309 as well as manage signals received through a series of receive antennas 312 and 313. Beam steering within the FoV is implemented with phase shifter (PS) circuits 316 and 318 coupled to the transmit antennas 308 and 309, respectively, on the transmit chain and PS circuits 320 and 322 coupled to the receive antennas 312 and 313, respectively, on the receive chain. Careful phase and amplitude calibration of the transmit antennas 308, 309 and receive antennas 312, 313 can be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle within the FoV using active beamforming antennas. A multiple element antenna can be used with an analog beamforming architecture where the individual antenna elements may be combined or divided at the port of the single receive or transmit chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

A major challenge with implementing analog beam steering is to design PSs to operate at 77 GHz. PS circuits 316, 318 and 320, 322 solve this problem with a PS design implemented with a distributed varactor network fabricated using suitable semiconductor materials, such as Gallium-Arsenide (GaAs) materials, among others. Each PS circuit 316, 318 and 320, 322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316, 318 and 320, 322 is controlled by a Field Programmable Gate Array (FPGA) 326, which provides a series of voltages to the PSs in each PS circuit that results in a series of phase shifts.

The DAC controller 390 is coupled to each of the LNAs 340-343, the amplifiers 323, 324, 364, 366, PS circuits 316, 318, 320, 322, the drivers 390, 392, 394, 396, and the power amplifiers (PAs) 328-331. In some aspects, the DAC controller 390 is coupled to the FPGA 326, and the FPGA 326 can drive digital signaling to the DAC controller 390 to provide analog signaling to the LNAs 340-343, the amplifiers 323, 324, 364, 366, PS circuits 316, 318, 320, 322, the drivers 390, 392, 394, 396, and the PAs 328-331. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables (LUTs) in the FPGA 326. These LUTs are generated by an antenna calibration process that determines which voltages to apply to each PS to generate a given phase shift under each operating condition. Note that the PSs in PS circuits 316, 318 and 320, 322 can generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution.

In various examples, each of the transmit antennas 308, 309 and the receive antennas 312, 313 may be a meta-structure antenna, a phase array antenna, or any other antenna capable of radiating RF signals in millimeter wave frequencies. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave (FMCW) signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to driver 390. From the driver 390, the signals are divided and distributed through feed network 334, which forms a power divider system to divide an input signal into multiple signals, one for each element of the transmit antennas 308. The feed network 334 may divide the signals so power is equally distributed among them or alternatively, so power is distributed according to another scheme, in which the divided signals do not all receive the same power. Each signal from the feed network 334 is then input to the PS circuit 316, where the FMCW signals are phase shifted based on control signaling from the DAC controller 390 (corresponding to voltages generated by the FPGA 326 under the direction of microcontroller 338), and then transmitted to the PA series 329. The amplified signaling from the PA series 329 is coupled to the transmit antennas 308. Signal amplification is needed for the FMCW signals to reach the long ranges desired for object detection, as the signals attenuate as they radiate by the transmit antennas 308.

In some implementations, the radar system 300 optionally includes multiple transmit chains. For example, a first transmit chain includes driver 390, feed network 334, phase shifter series 316, PA series 329, and transmit antennas 308, and a second transmit chain includes driver 392, feed network 336, phase shifter series 318, PA series 330, and transmit antennas 309. Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. The amplified signaling from PAs 329 and 330 are respectively coupled to the transmit antennas 308 and 309. Signal amplification is needed for the FMCW signals to reach the long ranges desired for object detection, as the signals attenuate as they radiate by the transmit antennas 308 and 309.

In some implementations, the couplers 378 and 380 are optionally coupled to the PAs 329 and 330 for calibration purposes. For example, from the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309 to radiate the outgoing signaling. In some implementations, the PS circuit 316 is coupled to the transmit antennas 308 through the PA 329 and coupler 378, and the PS circuit 318 is coupled to the transmit antennas 309 through the PA 330 and coupler 380.

In some implementations, the transceiver 306 feeds the FMCW signals to drivers 394 and 396, which are then fed to PAs 328 and 332 and to the couplers 376 and 382. In some implementations, the couplers 376 and 382 are coupled between the PAs 328 and 331 for calibration purposes. From these couplers, the FMCW signals are fed to the transmit guard antennas 307 and 310 for side lobe cancelation of the transmission signal. In some implementations, the transmit guard antennas 307 and 310 are optionally coupled to the PAs 328 and 331 and to the drivers 394 and 396.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. In some implementations, the received signaling is fed directly to the LNAs 341 and 342. The LNAs 341 and 342 are positioned between the receive antennas 312 and 313 and PS circuits 320 and 322, which include PSs similar to the PSs in PS circuits 316 and 318. In other implementations, the received signaling is then fed to couplers 372 and 373 using feedback calibration signaling from the transceiver 306. The couplers 370, 371, 372, and 373 can allow probing to the receive chain signal path during a calibration process. From the couplers 372 and 373, the received signaling is fed to LNAs 341 and 342.

For receive operation, PS circuits 320 and 322 create phase differentials between radiating elements in the receive antennas 312 and 313 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some instances, the FPGA 326 can provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 can generate multiple combined signals 346 and 348, of which each signal combines signals from a number of elements in the receive antennas 312 and 313, respectively. In one example, the receive antennas 312 and 313 include 128 and 34 radiating elements partitioned into two 34-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 can carry two RF signals to the transceiver 306, where each RF signal combines signaling from the 34-element and 32-element clusters of the receive antennas 312 and 313. Other examples may include 8, 26, 34, or 32 elements, and so on, depending on the desired configuration. The higher the number of antenna elements, the narrower the beam width. In some implementations, the combination network 344 is coupled to the receive antennas 312 and the combination network 345 is coupled to receive antennas 313. In some embodiments, the receive guard antennas 311 and 314 feed the receiving signaling to couplers 370 and 373, respectively, which are then fed to LNAs 340 and 343. The filtered signals from the LNAs 340 and 343 are fed to amplifiers 323 and 324, respectively, which are then fed to the transceiver 306 for side lobe cancelation of the received signals by the receiver processing.

In some implementations, the radar module 302 includes receive guard antennas 311 and 314 that generate a radiation pattern separate from the main beams received by the 34-element receive antennas 312 and 313. The receive guard antennas 311 and 314 are implemented to effectively eliminate side-lobe returns from objects after post processing. The goal is for the receive guard antennas 311 and 314 to provide a gain that is higher than the side lobes and therefore enable their elimination or reduce their presence significantly. The receive guard antennas 311 and 314 effectively act as a side lobe filter. Similar, the radar module 302 includes transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP engine 354 with an Analog-to-Digital Converter (ADC) module to convert the analog signals from transceiver 306 into digital signals that can be processed by the monopulse module 357 to determine angle of arrival (AoA) information for the localization, detection and identification of objects by perception engine 304. In one or more implementations, DSP engine 356 may be integrated with the microcontroller 338 or the transceiver 306.

Radar system 300 also includes a Graphical User Interface (GUI) 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In some implementations, the GUI 358 can provide for display a rendering of roadmap data that indicates range, velocity and AoA information for detected objects in the FoV. In some examples, the roadmap data can delineate between traffic moving toward the radar system 300 and traffic moving away (or receding from) the radar system 300 using a predetermined angular resolution (e.g., at or less than 1.6°) with angular precision based at least on the monopulse and/or guard channel detection techniques. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from cells in the transmit antennas 308.

In operation, the microcontroller 338 is responsible for directing the transmit antennas 308 and 309 to generate RF beams with determined parameters such as beam width, transmit angle, and so on. The microcontroller 338 may, for example, determine the parameters at the direction of perception engine 304, which may at any given time determine to focus on a specific area of a FoV upon identifying targets of interest in the ego vehicle's path or surrounding environment. The microcontroller 338 determines the direction, power, and other parameters of the RF beams and controls the transmit antennas 308 and 309 to achieve beam steering in various directions. The microcontroller 338 also determines a voltage matrix to apply to reactance control mechanisms coupled to the transmit antennas 308 and 309 to achieve a given phase shift. In some examples, the transmit antennas 308 and 309 are adapted to transmit a directional beam through active control of the reactance parameters of the individual cells that make up the transmit antennas 308 and 309.

Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received 4D radar data to the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus. This is achieved by changing the specific configurations and conditions of the transmit antennas 308. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 300.

All of these detection scenarios, analysis and reactions may be stored in the perception engine 304, such as in the database 352, and used for later analysis or simplified reactions. For example, if there is an increase in the echoes received at a given time of day or on a specific highway, that information is fed into the microcontroller 338 to assist in proactive preparation and configuration of the transmit antennas 308 and 309. Additionally, there may be some subarray combinations that perform better, such as to achieve a desired result, and this is stored in the database 352.

Figure 4A:
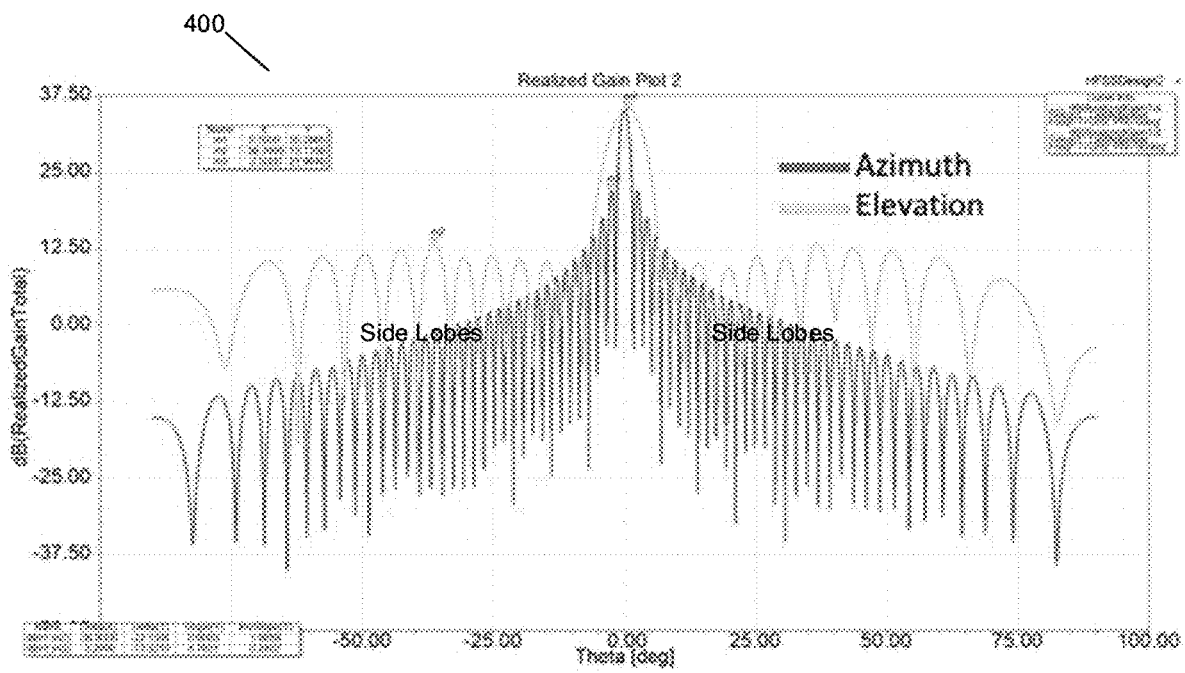
FIGS. 4A and 4B illustrate antenna gain plots in accordance with one or more implementations of the subject technology.
Figure 4B:
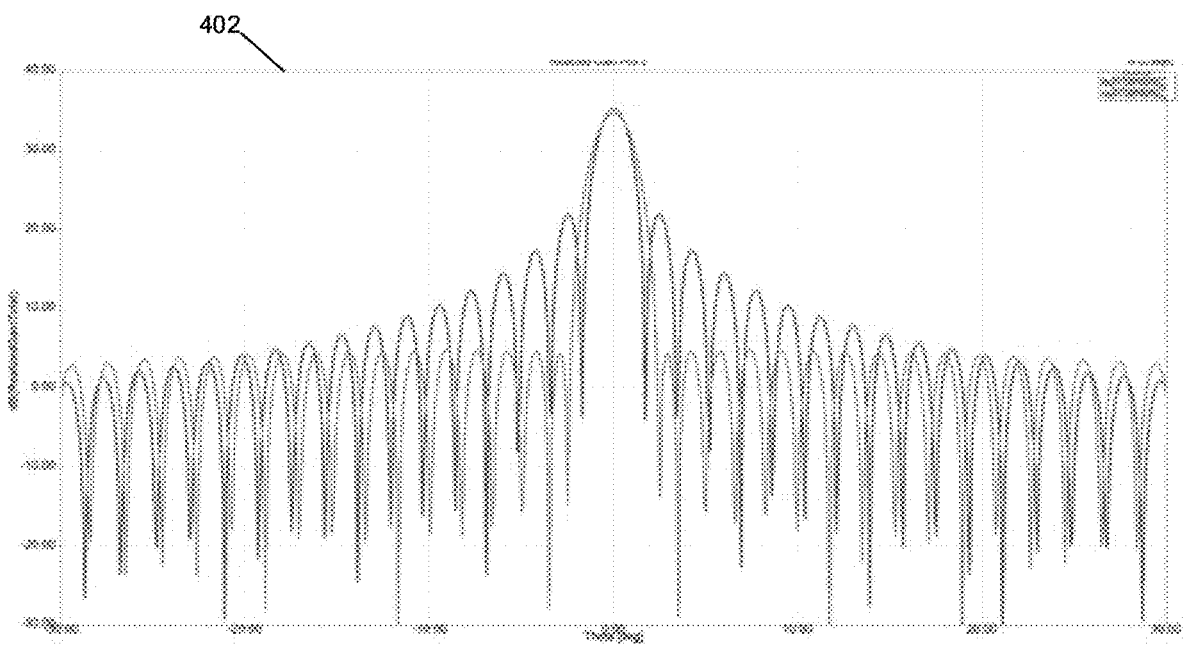

One challenge in deploying beam steering antennas in the analog domain is the trade-off between antenna gain and directivity and side lobe control. Side lobes often represent unwanted radiation in undesired directions and affect the accuracy of the object detection capability of the radar system. FIGS. 4A and 4B illustrate two antenna gain plots, a plot 400 in FIG. 4A showing the presence of significant side lobes and a plot 402 in FIG. 4B, illustrating the effect of side lobe control through amplitude tapering techniques described below. The plot 402 shows an ideal scenario where the main lobe gain is maintained while the side lobe levels are reduced.

Figure 5:
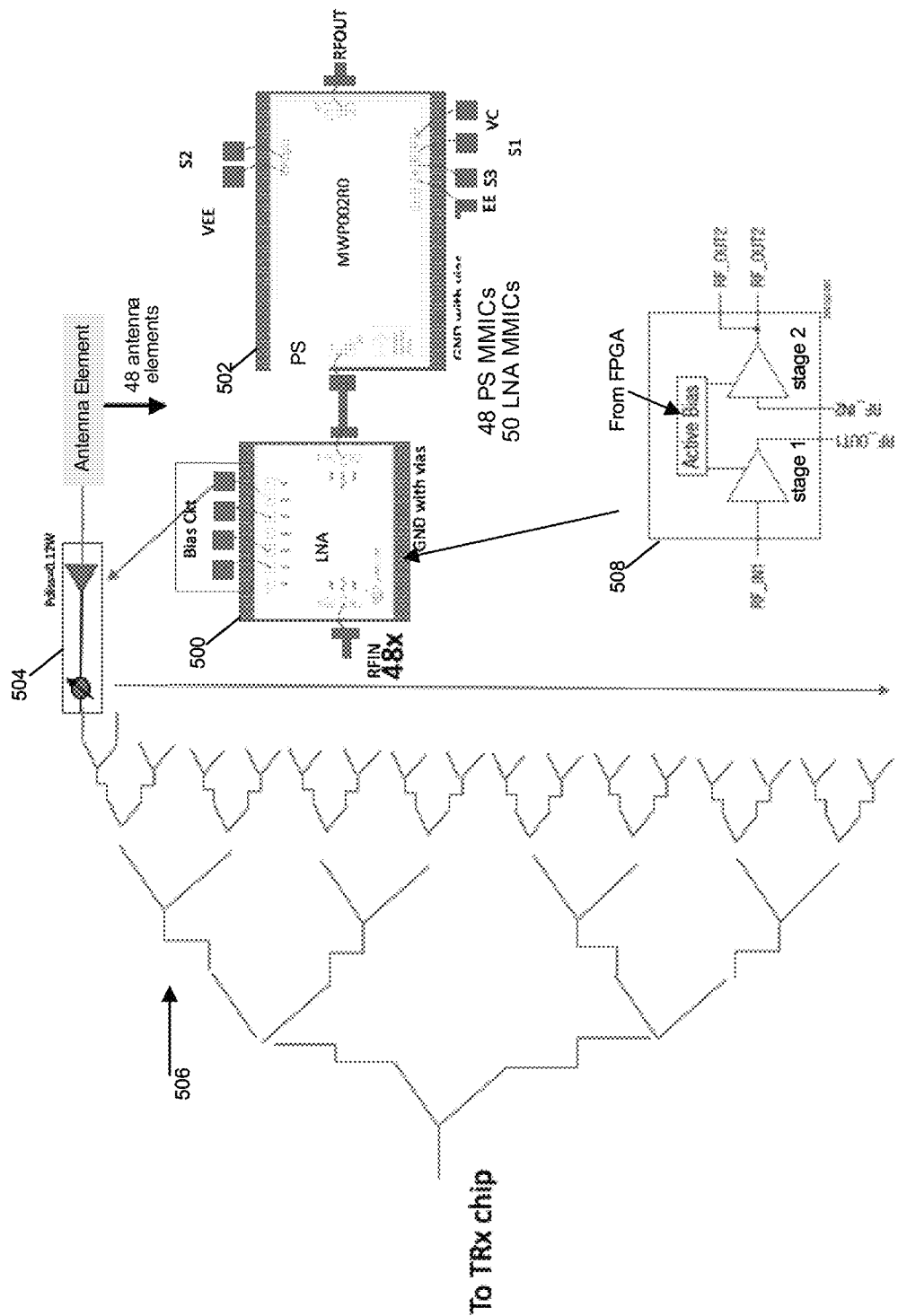
FIG. 5 is a schematic diagram of a low-noise amplifier (LNA) monolithic microwave integrated circuit (MMIC) coupled to a phase shifter (PS) MMIC for use with the beam steering radar system as in FIG. 3 in accordance with one or more implementations of the subject technology.

In various implementations, side lobe control is provided by active tapering, which refers to a process for assigning different gains to the various elements within an antenna array, where the center elements are assigned the highest gains, and the outer elements are assigned lower gains. Referring to FIG. 3, active tapering is implemented through control of the gain in the LNAs 341-342 coupled to receive antennas 312-313. FIG. 5 shows a low-noise amplifier (LNA) circuit, such as LNA monolithic microwave integrated circuit (MMIC) 500 coupled to a phase shifter (PS) MMIC 502 in accordance with various implementations of the subject technology. LNA MMIC 500 represents the LNAs 341-342 in the schematic diagram of FIG. 3. As shown in FIG. 3, the LNAs 341-342 are coupled to PS circuits 320-322, which in FIG. 5 are shown as PS MMIC 502. LNA MMIC 500 and PS MMIC 502 are also illustrated by the functional blocks 504, in between a 48-element antenna (e.g., receive antennas 312-313, each having 24 elements) and a combination network 506, shown in FIG. 3 as combination networks 344-345. In accordance with some embodiments, there are a total of 48 PS MMICs and 50 LNA MMICs (48 for the receive antennas and two more for the guard band antennas in the receive chain), resulting in a total of 684 wire bonds for all the channels in a manufactured PCB. In some embodiments, the total of number of PS MMICs and LNA MMICs can vary and therefore, the total number of wire bonds varies accordingly.

A further functional block diagram is shown with LNA 508, representing a two-stage LNA coupled to each element of the receive antennas. Gain control of the LNAs is provided by bias voltages stored in LUTs of FPGA 326 of FIG. 3. These bias voltage values can be obtained (determined) during a calibration process. Each bias voltage determined during calibration produces a given LNA gain. Better gain control of the LNA 508 can be achieved by changing the gain of the second stage of the LNA to ensure the impact on the noise figure of the signal is negligible. Additionally, this helps with the dynamic range of the LNA. The bias voltages and consequently LNA gain are adjusted so that a couple (or another set) of antenna elements on the edge of the antenna (e.g., the last two elements on each side of a 48-element antenna) have a gain that is lower than the other elements. This gain variation results in a lower amplitude of the side lobe levels, thereby improving the accuracy of the object detection for radar system 300.

Figure 6:
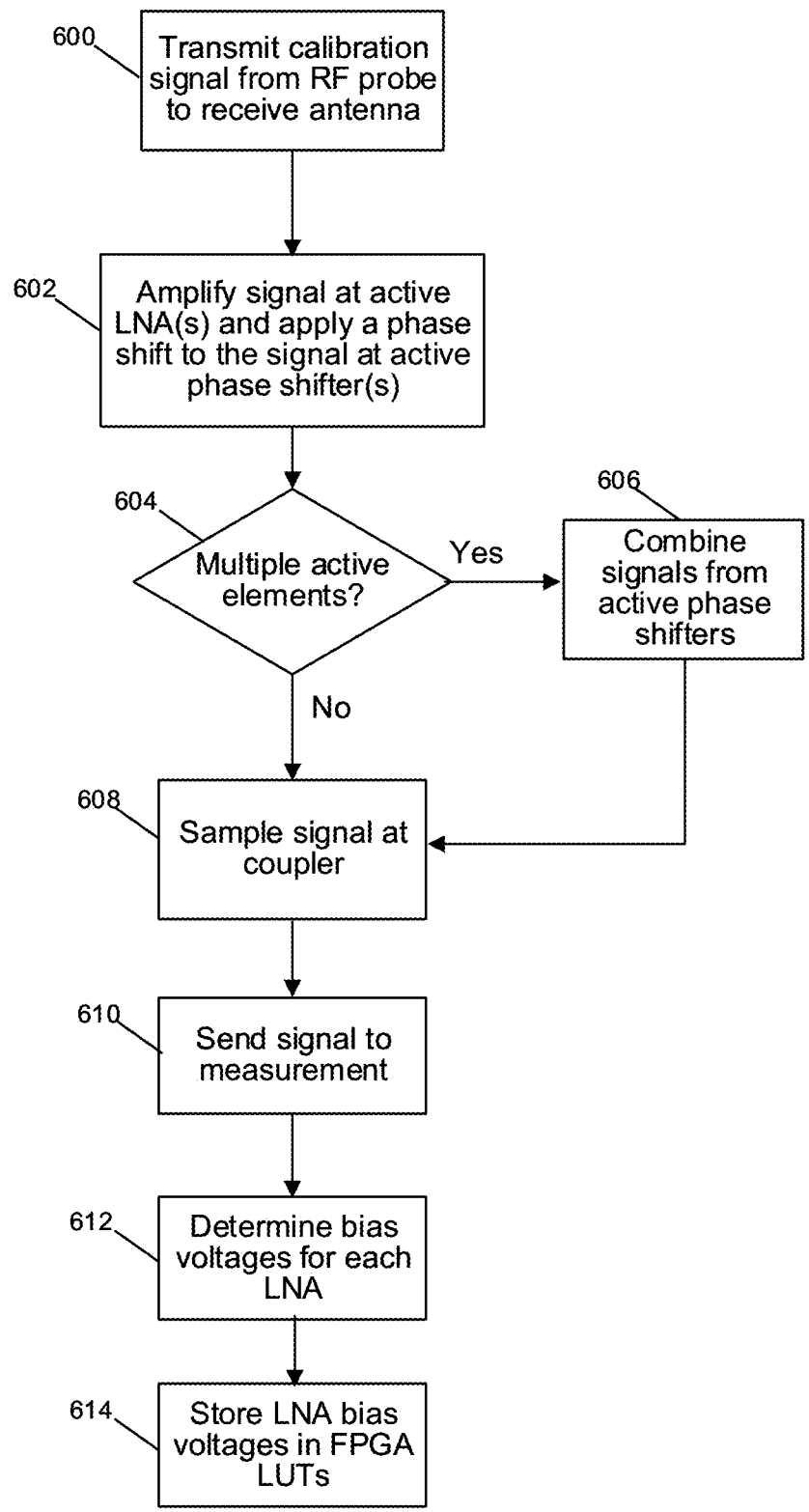
FIG. 6 is a flowchart for active tapering in a radar system as in FIG. 3 and in accordance with one or more implementations of the subject technology.

Attention is now directed to FIG. 6, which is a flowchart for active tapering in a radar system of FIG. 3 in accordance with one or more implementations of the subject technology. Active tapering is performed by calibrating the receive antennas to determine the bias voltages to be applied to each LNA to result in the desired gains. First, an RF calibration signal is transmitted from an RF probe to the receive antenna (600). The receive antenna has multiple elements in a phased array configuration and the calibration process may be performed element-by-element or with multiple elements at once. During element-by-element calibration, a single element is active at a time. Accordingly, the received signal is amplified at the active LNA(s) connected to the active antenna element(s) and phase shifted at the active phase shifter(s) connected to the active LNA(s) (602). The phase shifted signals are then combined at a combination network (604-606) to generate a signal that is input into a coupler (608). The signal from the coupler is sampled and output at a calibration connector connected to measurement equipment such as a Vector Network Analyzer (VNA) (610) to determine the operating characteristic of the active antenna element(s). The bias voltages for each LNA are determined at measurement (612) and as desired to achieve higher gains in the center antenna elements and lower gains in the edge elements. This process may be iterative until the right gain profile is realized. The resulting LNA bias voltages are then stored in the FPGA LUTs (614) to activate the LNAs with the desired gains. The result is improved object detection performance with lower side lobe levels. The improved performance is achieved with an elegant active tapering solution in which LNAs in the radar system have the dual purpose of providing antenna gain and controlling side lobe levels.

Figure 7:
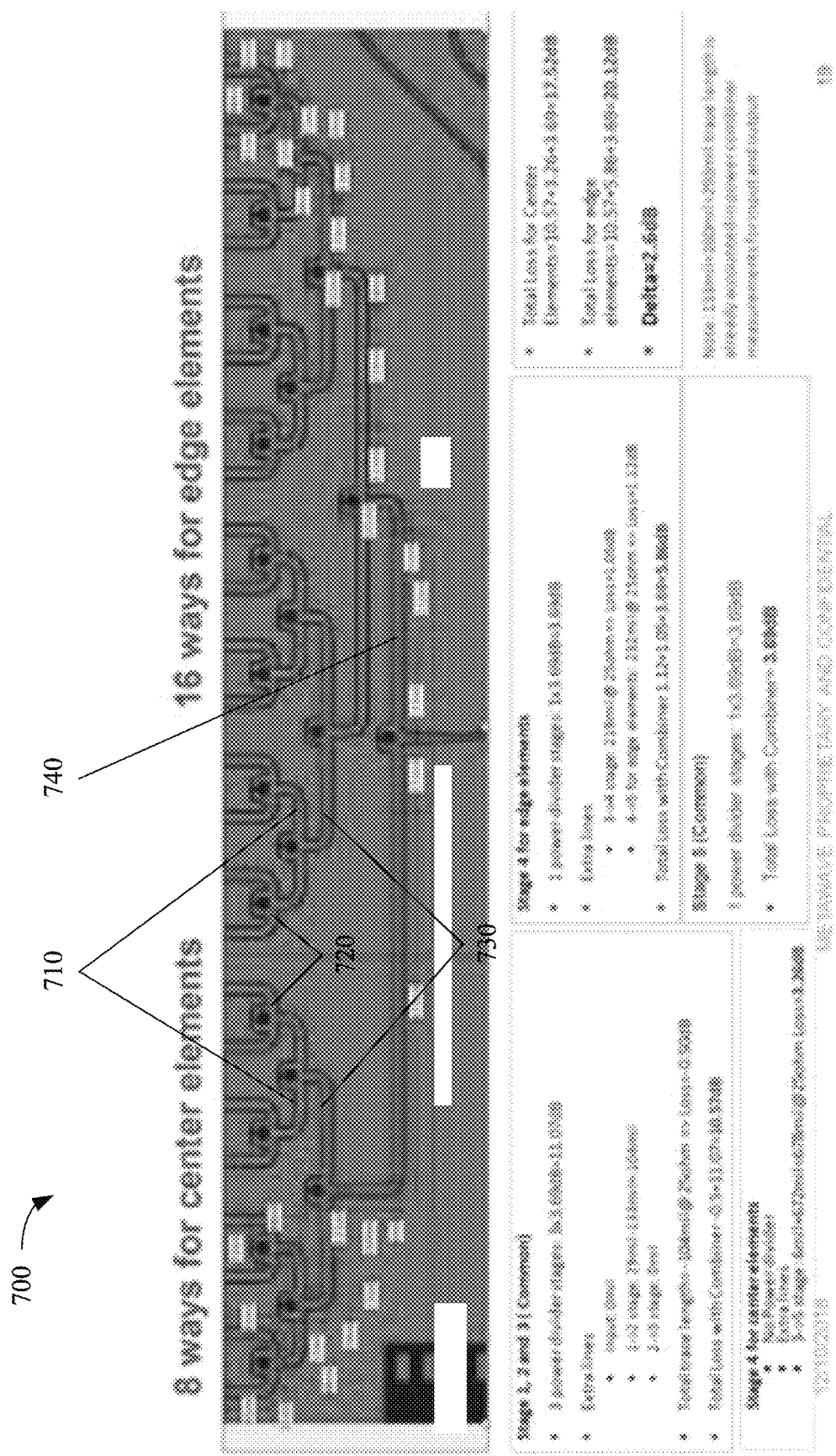
FIG. 7 is a schematic diagram for a combination network for use in a radar system as in FIG. 3 and in accordance with one or more implementations of the subject technology.

Another technique for lowering side lobe levels can be implemented in the hardware itself with a different design for the combination networks 344-345 coupled to the PS and LNA elements in the receive chain. The design process requires a few iterations from design to fabrication and to ensure the desired performance is achieved in the face of potential temperature variations and environmental and other conditions. FIG. 7 is a schematic diagram for a combination network for use in a radar system as in FIG. 3 and in accordance with one or more implementations of the subject technology. The goal of the design is to achieve a higher power for the received beams in the center of the antenna than the ones on the edges. The 48-element antenna can be partitioned in two center areas of 8 elements each and two edge portions of 16 elements. As seen in FIG. 7, the combination network for each center portion has 3 power divider stages (i.e., stages 710, 720, and 730), while the combination network for the edge portions is implemented with 4 power divider stages (i.e., stages 710, 720, 730, and 740). The extra stage is needed to feed the 16 elements but also to provide extra losses that will result in reduced power for the received edge beams. With this design, a higher power is achieved for the main lobes while lowering the power for the side lobes and thereby improving the overall object detection performance of the radar system.

Figure 8:
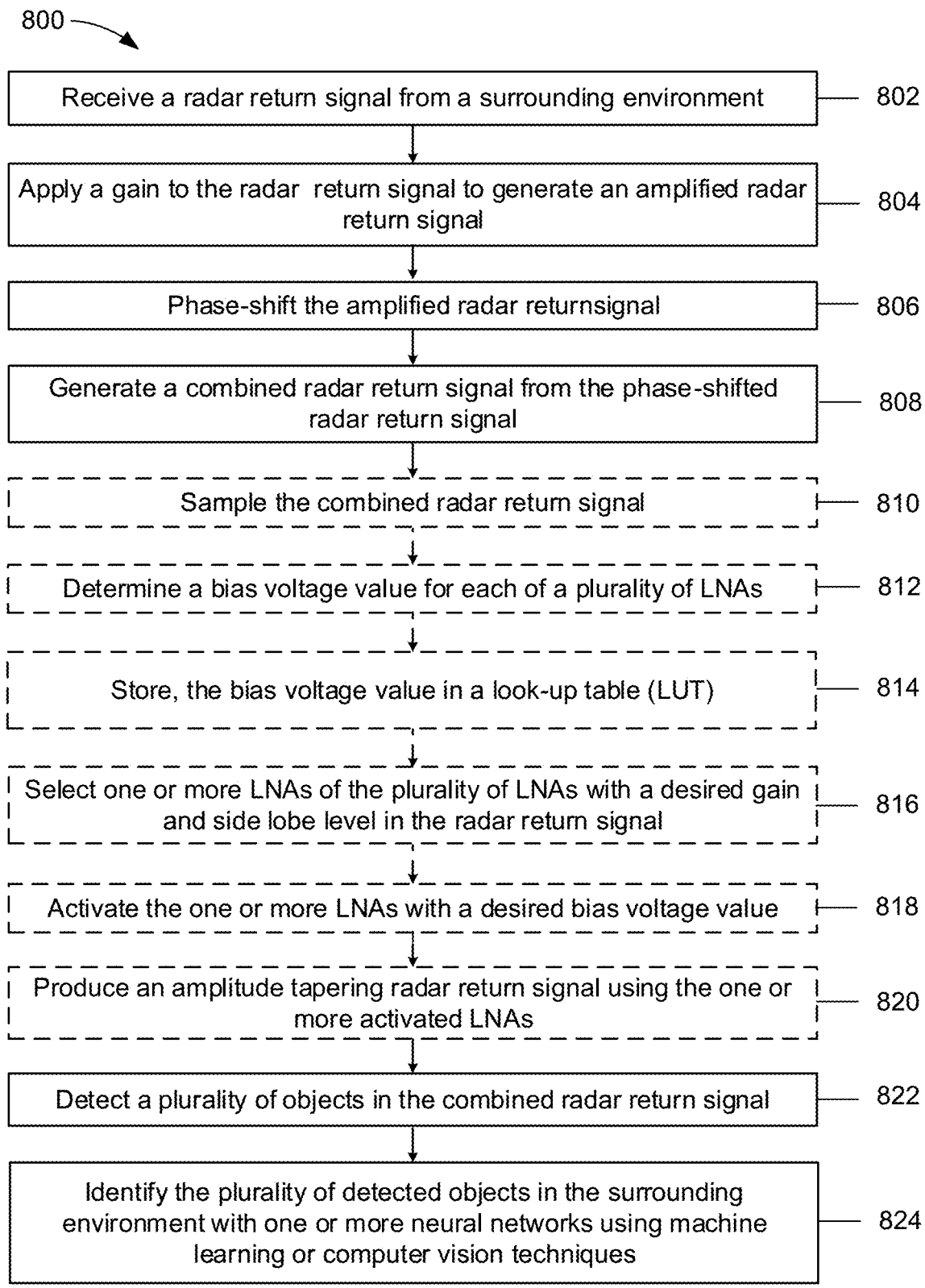
FIG. 8 is a flowchart for a method of active tapering in a beam steering radar in accordance with one or more implementations of the subject technology.

FIG. 8 is a flowchart for a method 800 of active tapering in a beam steering radar in accordance with one or more implementations of the subject technology. As illustrated in FIG. 8, the method 800 includes receiving a radar return signal from a surrounding environment at step 802. In some embodiments, the receiving the radar return signal from the surrounding environment occurs via a beam steering receive antenna having at least one center antenna element and at least one edge antenna element. At step 804, the method 800 includes applying a gain to the radar return signal to generate an amplified radar return signal. In some embodiments, the applying of a gain to the radar return signal to generate the amplified radar return signal occurs via a low-noise amplifier (LNA) circuit having a plurality of LNAs. In some embodiments, each LNA of the plurality of LNAs is coupled to the at least one center antenna element and the at least one edge antenna element. In some embodiments, the gain in the radar return signal is higher for an LNA that is coupled to the at least one center antenna element than the gain of an LNA that is coupled to the at least one edge antenna element.

The method 800 includes, at step 806, phase-shifting the amplified radar return signal. At step 808, the method 800 includes generating a combined radar return signal from the phase-shifted radar return signal. In some embodiments, the generating of the combined radar return signal from the phase-shifted radar return signal occurs via a combination network. In some embodiments, the method 800 optionally includes, at step 810, sampling the combined radar return signal. The method 800 optionally includes at step 812, determining a bias voltage value for each of the plurality of LNAs. At step 814, the method 800 optionally includes storing the bias voltage value in a look-up table (LUT). In accordance with some embodiments, the LUT is included in a field programmable gate array (FPGA). In some embodiments, the bias voltage value for each of the plurality of LNAs is obtained during a calibration process and stored in the LUT.

The method 800 further optionally includes, at step 816, selecting the one or more LNAs with a desired gain and side lobe level in the radar return signal. The method 800 optionally includes, at step 818, activating one or more LNAs with a desired bias voltage value. At step 820, the method 800 optionally includes producing an amplitude tapering radar return signal using the one or more activated LNAs. As further illustrated in FIG. 8, the method 800 includes detecting a plurality of objects in the combined radar return signal, at step 822; and identifying the plurality of detected objects in the surrounding environment with one or more neural networks using machine learning or computer vision techniques, at step 824.

It is appreciated that the beam steering radar system described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

The previous description of the disclosed examples is provided to enable any person skilled in the art to make or use the present disclosure. Various modifications to these examples will be readily apparent to those skilled in the art, and the in spirit or scope of the disclosure. Thus, the present disclosure is not intended to be limited to the examples shown herein but is to be accorded the widest scope consistent with the principles and novel features disclosed herein.

In accordance with various embodiments, a radar system for object identification is disclosed. The radar system includes a beam steering receive antenna configured to receive a radar return signal from a surrounding environment, wherein the beam steering receive antenna includes at least one center antenna element and at least one edge antenna element. The radar system also includes a low-noise amplifier (LNA) circuit having a plurality of LNAs. Each LNA of the plurality of LNAs is coupled to the at least one center antenna element and the at least one edge antenna element. Each LNA of the plurality of LNAs is configured to apply a gain to the radar return signal to generate an amplified radar return signal. The amplified radar return signal includes an amplitude tapering with a reduction of amplitude in antenna side lobes. The radar system also includes a perception engine configured to detect a plurality of objects in the amplified radar return signal and identify the plurality of detected objects in the surrounding environment with one or more neural networks using machine learning or computer vision techniques.

In various embodiments, the gain is higher for an LNA that is coupled to the at least one center antenna element than the gain of an LNA that is coupled to the at least one edge antenna element. In various embodiments, the reduction of amplitude in antenna side lobes is based on a lower gain of the LNA that is coupled to the at least one edge antenna element.

In some embodiments, the radar system also includes a phase shifter circuit having a plurality of phase shifters configured to apply a plurality of phase shifts to the amplified radar return signal. In some embodiments, the radar system also includes a field programmable gate array (FPGA) configured to provide a plurality of bias voltages to the plurality of phase shifters for producing the plurality of phase shifts. In some embodiments, a gain for each LNA of the plurality of LNAs is determined by a bias voltage obtained during a calibration process and stored in look-up tables (LUTs) of the FPGA. In some embodiments, the radar system also includes a plurality of couplers connected to the plurality of phase shifters, wherein the plurality of couplers is configured to provide feedback in the radar return signal, wherein the feedback in the radar return signal comprises operating characteristics of the at least one center antenna element and the at least one edge antenna element.

In various embodiments, the radar system may include a combination network having at least one center combination network and at least one edge combination network, wherein the at least one center combination network is configured to receive the amplified radar return signal originated from the at least one center antenna element and the at least one edge combination network is configured to receive the amplified radar return signal originated from the at least one edge antenna element. In some embodiments, the at least one edge combination network includes at least one more power divider stage than the at least one center combination network.

In accordance with various embodiments, a method of active tapering in a beam steering radar is described. The method includes receiving a radar return signal from a surrounding environment; applying a gain to the radar return signal to generate an amplified radar return signal; phase-shifting the amplified radar return signal; generating a combined radar return signal from the phase-shifted radar return signal; detecting a plurality of objects in the combined radar return signal; and identifying the plurality of detected objects in the surrounding environment with one or more neural networks using machine learning or computer vision techniques.

In some embodiments, prior to the detecting and identifying of the plurality of objects, the method may further include sampling the combined radar return signal; determining a bias voltage value for each of a plurality of LNAs; storing the bias voltage value in a look-up table (LUT); activating one or more LNAs of the plurality of LNAs with a desired bias voltage value; and producing an amplitude tapering radar return signal using the one or more activated LNAs.

In some embodiments, the bias voltage value for each of the plurality of LNAs is obtained during a calibration process and stored in the LUT. In some embodiments, prior to activating the one or more LNAs, the method may also include selecting the one or more LNAs with a desired gain and side lobe level in the radar return signal. In some embodiments, each LNA of a plurality of LNAs is coupled to at least one center antenna element and at least one edge antenna element. In some embodiments, the gain in the radar return signal is higher for an LNA that is coupled to the at least one center antenna element than the gain of an LNA that is coupled to the at least one edge antenna element.

In accordance with some embodiments, a beam steering radar for object identification is described. The beam steering radar includes a beam steering receive antenna having a plurality of center antenna elements and a plurality of edge antenna elements, the beam steering receive antenna configured to receive a radar return signal from a surrounding environment; a low-noise amplifier (LNA) circuit configured to amplify the radar return signal, the amplified radar return signal having an amplitude tapering with a reduction of amplitude in antenna side lobes; a phase shifter circuit configured to apply a plurality of phase shifts to the amplified radar return signal; and a perception engine configured to detect and identify a plurality of objects in the amplified radar return signal.

In some embodiments, the perception engine includes one or more neural networks and the one or more neural networks are configured to use machine learning or computer vision techniques in identifying the plurality of detected objects in the surrounding environment. In some embodiments, the beam steering radar may include a combination network coupled to the phase shifter circuit. In these embodiments, the combination network includes one or more center combination networks and one or more edge combination networks. The one or more center combination networks can be configured to receive the amplified radar return signal originated at the plurality of center antenna elements. Similarly, the one or more edge combination networks can be configured to receive the amplified radar return signal originated at the plurality of edge antenna elements.

In some embodiments, the one or more edge combination networks include at least one more stage than the one or more center combination networks, and the reduction of amplitude in the antenna side lobes is based on extra losses from the at least one more stage of the one or more edge combination networks. In some embodiments, the phase shifter circuit includes a plurality of phase shifters. In various embodiments, the beam steering radar can also include a field programmable gate array (FPGA) configured to provide a plurality of bias voltages to the plurality of phase shifters for producing the plurality of phase shifts.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system for object identification, comprising:
    a beam steering receive antenna configured to receive a radar return signal from a surrounding environment, wherein the beam steering receive antenna comprises at least one center antenna element and at least one edge antenna element;
    a low-noise amplifier (LNA) circuit having a plurality of LNAs, each LNA of the plurality of LNAs coupled to the at least one center antenna element and the at least one edge antenna element, wherein each LNA of the plurality of LNAs is configured to apply a gain to the radar return signal to generate an amplified radar return signal, the amplified radar return signal having an amplitude tapering with a reduction of amplitude in antenna side lobes;
    a combination network having one or more center combination networks and one or more edge combination networks, wherein:
        the one or more center combination networks are configured to receive the amplified radar return signal originated from the at least one center antenna element,
        the one or more edge combination networks are configured to receive the amplified radar return signal originated from the at least one edge antenna element, and
        the one or more edge combination networks comprise at least one more stage than the one or more center combination networks, and the reduction of amplitude in the antenna side lobes is based on extra losses from the at least one more stage of the one or more edge combination networks; and
    a perception engine configured to detect a plurality of objects in the amplified radar return signal and identify the plurality of detected objects in the surrounding environment with one or more neural networks using machine learning or computer vision techniques.

2. The radar system of claim 1, wherein the gain is higher for an LNA that is coupled to the at least one center antenna element than the gain of an LNA that is coupled to the at least one edge antenna element.

3. The radar system of claim 2, wherein the reduction of amplitude in antenna side lobes is based on a lower gain of the LNA that is coupled to the at least one edge antenna element.

4. The radar system of claim 1, further comprising:
    a phase shifter circuit having a plurality of phase shifters configured to apply a plurality of phase shifts to the amplified radar return signal.

5. The radar system of claim 4, further comprising:
    a field programmable gate array (FPGA) configured to provide a plurality of bias voltages to the plurality of phase shifters for producing the plurality of phase shifts.

6. The radar system of claim 5, wherein a gain for each LNA of the plurality of LNAs is determined by a bias voltage obtained during a calibration process and stored in look-up tables (LUTs) of the FPGA.

7. The radar system of claim 4, further comprising:
    a plurality of couplers connected to the plurality of phase shifters, wherein the plurality of couplers is configured to provide feedback in the radar return signal, wherein the feedback in the radar return signal comprises operating characteristics of the at least one center antenna element and the at least one edge antenna element.

8. The radar system of claim 1, wherein the one or more edge combination networks comprise at least one more power divider stage than the one or more center combination networks.

9. A method of active tapering in a beam steering radar, comprising:
receiving a radar return signal from a surrounding environment;
applying a gain to the radar return signal to generate an amplified radar return signal;
phase-shifting the amplified radar return signal;
generating, a combination network, a combined radar return signal from the phase-shifted radar return signal, wherein the combination network comprises one or more center combination networks and one or more edge combination networks, the one or more edge combination networks comprise at least one more stage than the one or more center combination networks, and the amplified radar return signal includes an amplitude tapering with a reduction of amplitude in antenna side lobes based on extra losses from the at least one more stage of the one or more edge combination networks;
detecting a plurality of objects in the combined radar return signal; and
identifying the plurality of detected objects in the surrounding environment with one or more neural networks using machine learning or computer vision techniques.

10. The method of claim 9, prior to the detecting and identifying of the plurality of objects, the method further comprising:
sampling the combined radar return signal;
determining a bias voltage value for each of a plurality of LNAs;
storing the bias voltage value in a look-up table (LUT);
activating one or more LNAs of the plurality of LNAs with a desired bias voltage value; and
producing an amplitude tapering radar return signal using the one or more activated LNAs.

11. The method of claim 10, wherein the bias voltage value for each of the plurality of LNAs is obtained during a calibration process and stored in the LUT.

12. The method of claim 10, further comprising:
prior to activating the one or more LNAs, selecting the one or more LNAs with a desired gain and side lobe level in the radar return signal.

13. The method of claim 9, wherein each LNA of a plurality of LNAs is coupled to at least one center antenna element and at least one edge antenna element.

14. The method of claim 13, wherein the gain in the radar return signal is higher for an LNA that is coupled to the at least one center antenna element than the gain of an LNA that is coupled to the at least one edge antenna element.

15. A beam steering radar for object identification, comprising:
a beam steering receive antenna having a plurality of center antenna elements and a plurality of edge antenna elements, the beam steering receive antenna configured to receive a radar return signal from a surrounding environment;
a low-noise amplifier (LNA) circuit configured to amplify the radar return signal, the amplified radar return signal having an amplitude tapering with a reduction of amplitude in antenna side lobes;
a phase shifter circuit configured to apply a plurality of phase shifts to the amplified radar return signal;
a combination network coupled to the phase shifter circuit, wherein:
the combination network comprises one or more center combination networks and one or more edge combination networks,
the one or more center combination networks are configured to receive the amplified radar return signal originated at the plurality of center antenna elements,
the one or more edge combination networks are configured to receive the amplified radar return signal originated at the plurality of edge antenna elements,
the one or more edge combination networks comprise at least one more stage than the one or more center combination networks, and the reduction of amplitude in the antenna side lobes is based on extra losses from the at least one more stage of the one or more edge combination networks; and
a perception engine configured to detect and identify a plurality of objects in the amplified radar return signal.

16. The beam steering radar of claim 15, wherein the perception engine comprises one or more neural networks and the one or more neural networks are configured to use machine learning or computer vision techniques in identifying the plurality of detected objects in the surrounding environment.

17. The beam steering radar of claim 15, wherein the phase shifter circuit comprises a plurality of phase shifters, the beam steering radar further comprising:
a field programmable gate array (FPGA) configured to provide a plurality of bias voltages to the plurality of phase shifters for producing the plurality of phase shifts.

* * * * *